(12) United States Patent
Koch

(10) Patent No.: US 11,175,646 B2
(45) Date of Patent: Nov. 16, 2021

(54) DISPLAY DEVICE FOR PROCESS AUTOMATION

(71) Applicant: KROHNE Messtechnik GmbH, Duisburg (DE)

(72) Inventor: Christian Koch, Witten (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 15/965,455

(22) Filed: Apr. 27, 2018

(65) Prior Publication Data

US 2018/0335767 A1 Nov. 22, 2018

(30) Foreign Application Priority Data

May 16, 2017 (DE) .................. 102017110633.2

(51) Int. Cl.
| | |
|---|---|
| *G05B 19/414* | (2006.01) |
| *G08C 19/00* | (2006.01) |
| *H04Q 9/00* | (2006.01) |
| *G05B 19/23* | (2006.01) |

(52) U.S. Cl.
CPC ......... *G05B 19/414* (2013.01); *G05B 19/234* (2013.01); *G08C 19/00* (2013.01); *H04Q 9/00* (2013.01)

(58) Field of Classification Search
None
See application file for complete search history.

(56) References Cited

U.S. PATENT DOCUMENTS

| | | | |
|---|---|---|---|
| 10,915,081 B1* | 2/2021 | Nixon | ................... H04L 63/101 |
| 2002/0082799 A1 | 6/2002 | Pramanik | |
| 2004/0148130 A1* | 7/2004 | Scott | .................... G05B 23/027 702/183 |
| 2004/0184517 A1* | 9/2004 | Westfield | ................. G01D 3/08 375/219 |

(Continued)

FOREIGN PATENT DOCUMENTS

| | | |
|---|---|---|
| DE | 19930661 A1 | 1/2001 |
| DE | 102008050354 A1 | 4/2010 |
| DE | 102014009354 A1 | 12/2015 |

OTHER PUBLICATIONS

European Search Report Application No. EP 18 163 107.8 Completed Oct. 23, 2018; dated Nov. 6, 2018 7 Pages.

*Primary Examiner* — Henry Tsai
*Assistant Examiner* — Christopher A Bartels
(74) *Attorney, Agent, or Firm* — Whitmyer IP Group, LLC

(57) ABSTRACT

A display device for process automation includes a display unit, a controller, a current loop interface and a fieldbus interface. The display device is designed for power supply via the current loop interface, and the controller is designed to assign an analog coded signal of an output data present at the current loop interface to a first input data and to display the first input data via the display unit. The controller is designed to request the transmission of the output data in the form of a digitally coded signal via the fieldbus interface, to receive the digitally coded signal via the fieldbus interface, to assign the digitally coded signal to a second input data, to perform a comparison between the first input data and the second input data, and to display a result of the comparison via the display unit.

19 Claims, 1 Drawing Sheet

(56) References Cited

U.S. PATENT DOCUMENTS

| | | | | |
|---|---|---|---|---|
| 2004/0260408 | A1* | 12/2004 | Scott | G05B 23/0213 |
| | | | | 700/20 |
| 2007/0025125 | A1* | 2/2007 | Nakahori | H02M 1/32 |
| | | | | 363/56.02 |
| 2008/0280568 | A1* | 11/2008 | Kielb | G01D 21/00 |
| | | | | 455/74.1 |
| 2009/0072994 | A1* | 3/2009 | Kleven | G01D 21/00 |
| | | | | 340/870.05 |
| 2010/0004761 | A1* | 1/2010 | Flanders | G05B 9/03 |
| | | | | 700/28 |
| 2010/0164717 | A1* | 7/2010 | Hammer | G05B 19/0425 |
| | | | | 340/540 |
| 2011/0062942 | A1* | 3/2011 | Karbula | G05B 1/03 |
| | | | | 324/76.11 |
| 2011/0187205 | A1* | 8/2011 | Karbula | H02M 3/28 |
| | | | | 307/154 |
| 2011/0282467 | A1* | 11/2011 | Schulte | G05B 19/0423 |
| | | | | 700/22 |
| 2013/0027237 | A1* | 1/2013 | Washiro | H03M 1/02 |
| | | | | 341/144 |
| 2014/0039833 | A1* | 2/2014 | Sharpe, Jr. | G05B 23/0229 |
| | | | | 702/183 |
| 2014/0257756 | A1* | 9/2014 | van der Linde | G05B 19/0428 |
| | | | | 702/189 |
| 2016/0161533 | A1* | 6/2016 | Simon | G01R 19/1659 |
| | | | | 324/103 R |
| 2016/0203344 | A1* | 7/2016 | Fink | G06F 21/86 |
| | | | | 726/26 |
| 2017/0264295 | A1* | 9/2017 | Slattery | H03K 19/17764 |
| 2018/0120454 | A1* | 5/2018 | Mueller | G01T 1/175 |
| 2018/0321662 | A1* | 11/2018 | Nixon | G06F 13/364 |
| 2018/0335767 | A1* | 11/2018 | Koch | G08C 19/00 |
| 2018/0364685 | A1* | 12/2018 | Sprenger | G05B 19/4186 |

* cited by examiner

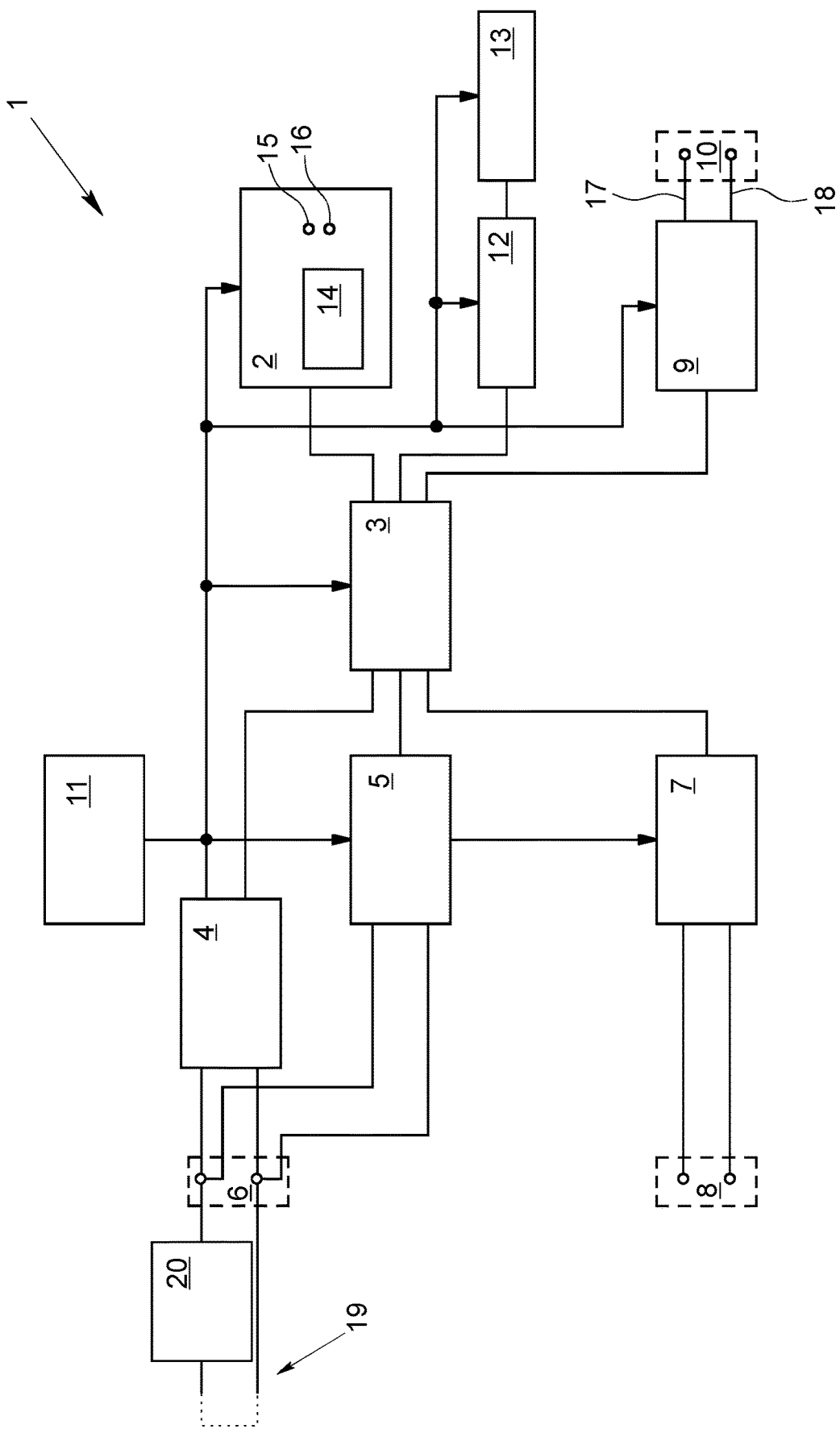

DISPLAY DEVICE FOR PROCESS AUTOMATION

TECHNICAL FIELD

The invention relates to a display device for process automation. The display device has a display unit, a controller, an analog current loop interface and a digital fieldbus interface. In this case, the display device is designed for power supply via the current loop interface and further the controller is designed to assign an analog coded signal of an output data present at the current loop interface to a first input data and to display the first input data via the display device.

BACKGROUND

Process automation is concerned with the automation of industrial processes, such as manufacturing processes. Such processes are controlled, inter alia, by actuators and monitored by sensors. Actuators are, for example, control elements and valves, and sensors are, for example, flow, level, temperature, pressure, analytical, gas or steam measuring devices. Analytical measuring devices are, in particular, those for measuring a pH, turbidity or conductivity of a medium. Such actuators and sensors are preferably designed as field devices.

Field devices fundamentally have an interface for a fieldbus and are designed for communication with a control and/or a guidance system via the fieldbus. Thus, field devices are centrally controllable by a control and/or guidance system. Only by the central controllability of actuators and sensors is a process automation meaningfully possible. A fieldbus, be it an analog fieldbus such as the analog current loop or a digital fieldbus, requires a transmission medium, which has at least one electrical conductor in the present case. In this case, these are wired fieldbuses.

Output data, for example, is a measured value measured by a sensor or a set value provided to an actuator. For example, output data is encoded by a field device into an analog signal by generating the signal with a parameter having a particular value. The value corresponds by convention to the output data. The parameter is, for example, the magnitude, the amplitude or the frequency of the signal. The measure of the value is, for example, voltage or current. Thus, analog coded signals are usually continuous value signals and not value discrete signals, such as digitally coded signals.

Current loops can be used in addition to the transmission of analog coded signals for the electrical power supply of devices located in the current loop, such as field devices and display devices. The devices located in a current loop are fundamentally electrically connected in series with the current loop. Accordingly, the display device is also designed for power supply via the current loop interface. This means that the display device receives the power it needs to operate via the current loop interface.

For example, a current loop as analog fieldbus has a sensor as a field device and a display device which is connected to the current loop via its analog current loop interface. During operation, the field device measures a value as output data and executes the analog coding of the output data by generating an electrical signal current whose magnitude corresponds by convention to the measured value. The transmission of output data via the fieldbus is effected by imposing the signal current on the fieldbus by the field device. The controller of the display device is designed to assign a first piece of input data to this analog coded signal of the output signal, which, in the ideal case, corresponds to the output data. Since the process of analog coding of output data in an analog signal is characterized by inaccuracies, particularly due to tolerances in the production of field devices and external disturbances on field devices, the first piece of input data often does not correspond to the output data and the first input data deviates from the output data by a deviation that is often intolerable for the application in which a field device is used.

SUMMARY

Thus, an object of the invention is to provide a display device designed to monitor analog coded signals present at the current loop interface.

The described object is achieved by a display device initially and essentially in that the controller is designed to request the transmission of the output data in the form of a digitally coded signal via the fieldbus interface, to receive the digitally coded signal via the fieldbus interface, to assign the digitally coded signal to a second input data, to perform a comparison between the first input data and the second data input, and to display a result of the comparison via the display unit.

With respect to the example of a current loop with a field device and a display device mentioned above, this means that both the display device and the field device each have a fieldbus interface in addition to a current loop interface. During operation, the controller of the display device is then transmitting a digitally coded signal of a piece of data to the field device via the fieldbus interface, in which the transmission of the output data in the form of a digitally coded signal from the field device to the display device is requested. The field device then transmits the digitally coded signal of the output data to the display device, the display device receives the digitally coded signal via the fieldbus interface and assigns the digitally coded signal to a second input data. The controller will then compare the first input data with the second input data. The explanations in this example are also generally valid.

If the result of the comparison of the controller is that the second input data and the first input data are the same, then this means that the process of analog coding was accurate. If the result of the comparison is that there is a deviation of the first input data from the second input data, then this means that the process of analog coding was not exact. In this case, the controller preferably assesses whether the deviation is greater than a limit deviation stored in the controller. The result of this comparison is then displayed via the display unit, whereby the analog coded signal is monitored. Due to the nature of the digital encoding of the second input data, this is assumed to be accurate by the controller. Thus, it is assumed that a deviation of the first input data from the second input data corresponds to a deviation of the first input data from the output data.

A signal, such as an analog or digitally encoded signal, represents a piece of data, such as the output data, the first input data, and the second input data. A signal is formed thereby for transmission via a fieldbus, such as an analog or digital fieldbus. A piece of data is, for example, a pH measured by a sensor, a measured conductivity or a measured temperature, or a setpoint for an actuator or a parameter for a field device. An analog fieldbus is, in particular, the current loop. In the present case, fieldbuses are wired and the signals are electrical.

In one design of the display device, it is provided that the display device has a display for displaying the result of the comparison. It is further provided that the display and the controller are designed to display the first input data and the second input data simultaneously on the display. By simultaneously displaying both the first input data and the second input data on the display, the amount of deviation, on the one hand, and on the other hand, the direction of deviation of the first input data from the second input data are immediately apparent. In particular, the amount of deviation is a measure of whether the deviation is still acceptable for the particular application or whether measures should be taken to counter the deviation. If measures are to be taken, the direction of the deviation is helpful in the error diagnosis.

In a further design of the display device, it is provided that the display device has light sources with different luminous colors. Furthermore, the controller is designed to control the light sources for displaying the result of the comparison. Light-emitting diodes are preferably used as light sources. A light-emitting diode is also referred to as the abbreviation LED. For example, it is provided that the display unit and thus also the controller is designed according to the NAMUR recommendation 107. This design is effected, for example, in that the display device has a yellow LED and a red LED and the controller is designed to trigger the yellow LED when the deviation between the first input data and the second input data is less than a limit deviation, and to trigger the red LED when the deviation is greater than the limit deviation. The limit deviation separates an area in which a specification is not met (yellow LED) from an area in which an error exists (red LED).

In a further design, it is provided that the display device has an electrical interface terminal for an electric fieldbus and that the electrical current loop interface and the electric fieldbus interface are electrically connected to the interface terminal. Thus, the current loop interface and the fieldbus interface are electrically connected in parallel to the interface terminal. The display device, thus, has a minimum possible number of electrical terminals.

It is provided in a further design that the current loop interface is designed to encode and/or decode signals as uniform current signals and also to transmit them. Uniform current signals are standardized in DIN IEC 60381-1.

In a further design, it is provided that the fieldbus interface is designed to encode and/or to decode signals according to a HART standard and also to transmit them. Preferably, the fieldbus interface is additionally designed for multi-drop operation, so that communication is possible not only with one, but also with multiple field devices.

In a further design, it is provided that the display device has a further current loop interface in addition to the current loop interface. The controller is designed, for example, to assign an analog coded signal of a further piece of output data present at the further current loop interface to a further piece of input data and to display the further input data via the display unit.

It is provided in a further design that the display device has at least one relay and the controller is designed to control the at least one relay. A relay is, for example, an electromagnetically operated switch or a semiconductor switch, which is also referred to as a semiconductor relay. A relay typically has a first electrical relay contact and a second electrical relay contact, wherein the first and second relay contacts are either electrically shorted together or electrically isolated from one another in dependence on the control of the relay by the controller.

In a development of the above design, it is provided that the controller is designed to display a state of the at least one relay on the display unit. For example, a first state of a relay is that the first and second relay contacts are short-circuited, and a second state is that the first and second relay contacts are electrically separated from each other. If the display unit has light sources with different luminous colors, it is advantageous when the controller is additionally designed to display states of the at least one relay, such as the described states, on the display unit with the light source.

If the display device has at least one relay and the controller is designed to control the at least one relay, it is further advantageous when the controller is additionally designed to set a state of the at least one relay in dependence on the result of the comparison. For example, in the controller, when a maximum allowable limit deviation between the first input data and the second input data is stored for an application, it is advantageous to set a first state of the relay when the deviation between the first input data and the second input data is smaller than the limit deviation and set a second state of the relay when the deviation is greater than the limit deviation. Thus, the relay can transmit the result of the monitoring with the display device to a remote receiver. In addition, for example, the controller is designed to display the current state of the relay also on the display unit.

In a further design, it is provided that the controller is designed to store and transmit parameters to a field device. For example, these parameters are parameters that determine the analog coding of a piece of data in a signal. Thus, it is possible to correct a deviation between the first input data and the second input data.

In a further design it is provided that the display device has a wireless interface for a wireless module and the controller is designed for communication via the wireless interface. The wireless module is preferably a Bluetooth wireless module.

If the controller of the display device is designed for storing and transmitting parameters to a field device, the display device has a wireless interface and the controller is also designed for communication via the wireless interface, it is further advantageous, when the controller is additionally designed to receive the parameters via the wireless interface. Thus, it is possible to first transmit parameters wirelessly to the display device, store them there and then transfer them to a field device or even multiple field devices.

In a further development of the above design or, if the display device has at least one wireless interface and the controller is designed for communication via the wireless interface, it is provided that the controller is designed for parameterization via the wireless interface. This makes it possible for the controller to parameterize itself via the wireless interface.

In a further design, it is provided that the display device has an energy storage device, such as a battery or accumulator, for power supply. Advantageously, in this design, the controller is designed to switch from power supply via the current loop interface to power supply via the energy storage when power supply via the current loop interface is interrupted or insufficient.

In detail, there are a variety of possibilities for designing and further developing the display device for process automation according to the invention. Reference is made to both the claims subordinate to the independent claim and to the following description of a preferred embodiment in conjunction with the FIGURE.

BRIEF DESCRIPTION OF THE DRAWING

FIG. 1 shows, abstracted and schematically, the display device 1 for process automation.

DETAILED DESCRIPTION

Referring to FIG. 1, the display device 1 comprises the display unit 2, the controller 3, the current loop interface 4, the fieldbus interface 5, the interface terminal 6, the further current loop interface 7, the further interface terminal 8, the relay 9, the relay terminal 10, a battery as the energy storage device 11 and the wireless interface 12. The wireless interface 12 is connected to the wireless module 13 not belonging to the display device 1. The display unit 1 has the display 14, the yellow light source 15 and the red light source 16, wherein the sources are LEDs. The relay 9 has the first relay contact 17 and the second relay contact 18, which are electrically connected to the relay terminal 10.

Further, FIG. 1 shows a part of the current loop 19 and the measuring device 20 electrically connected to the current loop. The measuring device 20 is a sensor designed as a field device and designed for transmitting uniform current signals and according to a HART standard. The interface terminal 6 of the display device 1 is connected to the current loop 19 such that the display device 1 is electrically in series with the current loop 19.

The display device 1 is designed for power supply via the current loop interface 4. This means that the display device 1 receives the energy it requires for operation from the current loop 19 via the current loop interface 4, i.e. ultimately via the interface terminal 6. Alternatively, the display device 1 can also receive energy that it needs for operation from the energy storage device 11. In this case, the controller 3 is designed such that it is switched from supply via the interface terminal 6 to supply via the energy storage device 11 when the energy supplied via the interface terminal 6 is not sufficient for operation of the display device 1 or the interface terminal 6 of the current loop 19 is disconnected. In addition, it is provided that it is also possible to specify for the controller 3, for example via the fieldbus interface 5, whether supply is to be made via the interface terminal 6 from the current loop 19 or from the energy storage device 11. The current loop interface 4 itself, the display unit 2, the controller 3, the fieldbus interface 5, the relay 9, the wireless interface 12 and the wireless module 13 are supplied with electrical energy via the current loop interface 4 or the energy storage device 11. Supply of the further current loop interface 7 takes place in the present embodiment via the further interface terminal 8. The energy flow is indicated in FIG. 1 by lines with arrowheads.

Not only the current loop interface 4, but also the fieldbus interface 5 is electrically connected to the interface terminal 6. In this case, the connection of the current loop interface 4 to the interface terminal 6, on the one hand, and the connection of the fieldbus interface 5 to the interface terminal 6, on the other hand, is such that the current loop interface 4 and the fieldbus interface 5 are electrically connected in parallel. The current loop interface 4 and the further current loop interface 7 are designed for uniform current signals, whereas the fieldbus interface 5 is designed according to a HART standard. Thus, the display device 1 is designed to communicate with the measuring device 20 both via the current loop interface 4 and via the fieldbus interface 5. The current loop 19 is a wire-bound transmission medium.

The controller 3, on the one hand, and the display device 2, the current loop interface 4, the fieldbus interface 5, the further current loop interface 7 and the wireless interface 12, on the other hand, are designed to communicate with one another and, for this, are electrically connected to one another. Further, the wireless interface 12 and the wireless module 13 are electrically connected to one another for communication.

The controller 3 is designed and configured to execute the following during operation of the display device 1: It assigns an analog coded signal of an output data present at the current loop interface 4 to a first input data. The output data in this embodiment is a measured value which has been measured by the measuring device 20 and has been output to the current loop 19 as an analog coded signal. This signal is a uniform current signal. The controller 3 then requests the transmission of the same output data from the measuring device 20 in the form of a digital coded signal via the fieldbus interface 5. The measuring device 20 then encodes the output data in a digital signal and outputs it to the current loop 19. The controller 3 receives the digitally coded signal via the fieldbus interface 5 and assigns the digitally coded signal to a second input data. Thus, the output data is now available to the controller 3 as the first input data and as the second input data. It further performs a comparison between the first input data and the second input data and displays a result of the comparison via the display unit 2. The display of the result of the comparison is made, on the one hand, by simultaneously displaying both the first input data and the second input data on the display 14 and, on the other, via the light sources 15, 16. For display via the light source 15, 16, a limit deviation is stored in the controller 3 and the controller 3 is configured for implementing the NAMUR recommendation 107. If the deviation between the first input data and the second input data is smaller than the limit deviation, the controller 3 triggers the yellow lamp 15, and if the deviation is greater than the limit deviation, the controller 3 triggers the red lamp 16. Thus, on the basis of the light sources, an operator can easily recognize whether the communication via analog coded signals is still sufficiently accurate, i.e. the deviation is smaller than the limit deviation, or not, i.e. the deviation is greater than the limit deviation.

In addition, the controller 3 controls the relay 9 so that the state of the relay 9 represents the result of the comparison. In this case, the relay can assume a first and a second state. The first state is characterized in that the first relay contact 17 and the second relay contact 18 are electrically short circuited and the second state is characterized in that the first relay contact 17 and the second relay contact 18 are electrically isolated from one another. The first state is assigned the significance that the deviation is smaller than the limit deviation and the second state is assigned the significance that the deviation is greater than the limit deviation. A deviation equal to the limit deviation is basically considered to be a deviation smaller than the limit deviation. The relay 9 thus enables the transmission of the result of the comparison to a remote receiver which is connected to the relay terminal 10.

In addition, the controller 3 is configured for storing parameters for field devices and also for transmitting these parameters to field devices, such as the measuring device 20 in the present embodiment. The controller 3 is further configured to receive parameters for field devices as well as parameters for its own controller 3 for the parameterization via the wireless interface 12. For this, the wireless interface 12 is configured for communication with the wireless module 13. For example, if the controller 3 determines that the deviation is greater than the limit deviation, the controller 3 transmits parameters to the measuring device 20 to compensate for the deviation.

The invention claimed is:

1. A process automation display device for monitoring signals transmitted on a current loop by a field device, the display device comprising:
a display unit;
a controller;
a current loop interface; and
a fieldbus interface;
wherein the display device is designed for power supply via the current loop interface;
wherein the controller is designed to:
receive, via the current loop interface, an analog signal transmitted on the current loop by the field device, the analog signal including an analog coded value;
generate a first input data corresponding to the analog coded value;
display the first input data via the display unit;
transmit a request to the field device via the fieldbus interface, the request causing the field device to transmit on the current loop a digital signal including a digital coded value, wherein the digital coded value and the analog coded value each correspond to a same actual value measured by the field device;
receive, via the fieldbus interface, the digital signal transmitted from the field device to the current loop;
generate a second input data corresponding to the digital coded value;
perform a comparison between the first input data and the second input data; and
display a result of the comparison via the display unit.

2. The display device according to claim 1, wherein the display unit has a display for displaying the result of the comparison, and the controller is designed to display the first input data and the second input data simultaneously on the display.

3. The display device according to claim 1, wherein the display unit has light sources with different luminous colors and the controller is designed to control the light sources for displaying the result of the comparison.

4. The display device according to claim 1, wherein the display device has an interface terminal for a fieldbus; and wherein the current loop interface and the fieldbus interface are connected to the interface terminal.

5. The display device according to claim 1, wherein the current loop interface is designed for uniform current signals according to DIN IEC 60381-1.

6. The display device according to claim 1, wherein the fieldbus interface is designed according to a HART standard.

7. The display device according to claim 1, wherein the display device has a further current loop interface.

8. The display device according to claim 1, wherein the display device has at least one relay and the controller is designed to control the at least one relay.

9. The display device according to claim 8, wherein the controller is designed to display a state of the relay in the display unit.

10. The display device according to claim 8, wherein the controller is designed to set a state of the at least one relay in dependence on the result of the comparison.

11. The display device according to claim 1, wherein the controller is designed to store and to transmit parameters to the field device.

12. The display device according to claim 1, wherein the display device has a wireless interface for a wireless module and the controller is designed for communication via the wireless interface.

13. The display device according to claim 12, wherein the controller is designed to receive parameters via the wireless interface.

14. The display device according to claim 12, wherein the controller is designed for parameterization via the wireless interface.

15. The display device according to claim 1, wherein the display device has an energy storage device for supplying energy.

16. The display device according to claim 1, wherein the display device has an interface terminal for a fieldbus and that the current loop interface and the fieldbus interface are connected to the interface terminal; and
wherein the display device has a further current loop interface.

17. The display device according to claim 1, wherein the display device has at least one relay and the controller is designed to control the at least one relay;
wherein the controller is designed to display a state of the relay in the display unit; and
wherein the controller is designed to set a state of the at least one relay in dependence on the result of the comparison.

18. A process automation display device for monitoring signals transmitted on a current loop by a field device, the display device comprising:
a terminal interface configured to be electrically connected to the current loop;
a controller electrically connected to the terminal interface, the controller configured to receive power from the current loop via the terminal interface, and configured for two-way communication with the field device via the terminal interface and the current loop;
a display unit electrically connected to the terminal interface and the controller, the display unit configured to receive power from the current loop via the terminal interface, and configured to receive display data from the controller;
wherein the controller is configured to:
receive, via the terminal interface, an analog signal transmitted on the current loop by the field device, the analog signal including an analog coded value;
generate a first input data corresponding to the analog coded value;
transmit a request signal to the field device via the terminal interface and the current loop, the request signal causing the field device to transmit on the current loop a digital signal including a digital coded value, wherein the digital coded value and the analog coded value each correspond to a same actual value measured by the field device;
receive, via the terminal interface, the digital signal transmitted on the current loop by the field device;
generate a second input data corresponding to the digital coded value;
generate display data for transmission to the display unit, the display data including a result of a comparison between a first input data and the second input data.

19. The display device of claim 18, further comprising:
a current loop interface and a fieldbus interface electrically connected in parallel to the terminal interface;

wherein the controller is configured to receive power from the current loop via the current loop interface and the terminal interface, and configured for communication with the field device via the fieldbus interface and the terminal interface;

wherein the display unit is configured to receive power from the current loop via the current loop interface and the terminal interface; and wherein the controller is configured to receive the analog signal transmitted by the field device via the terminal interface and the fieldbus interface, and configured to transmit the request signal to the field device via the terminal interface and the fieldbus interface.

\* \* \* \* \*